United States Patent
Kishimoto et al.

(10) Patent No.: US 7,414,354 B2
(45) Date of Patent: Aug. 19, 2008

(54) FILTER SUBSTRATE AND COLOR DISPLAY USING THE SAME

(75) Inventors: Yoshihiro Kishimoto, Tokyo-To (JP); Minoru Komada, Tokyo-To (JP)

(73) Assignee: Dai Nippon Printing Co., Ltd., Shinjuku-ku (JP)

( * ) Notice: Subject to any disclaimer, the term of this patent is extended or adjusted under 35 U.S.C. 154(b) by 308 days.

(21) Appl. No.: 11/149,448

(22) Filed: Jun. 9, 2005

(65) Prior Publication Data
US 2006/0024512 A1    Feb. 2, 2006

(30) Foreign Application Priority Data
Jun. 11, 2004    (JP) .............................. 2004-173273

(51) Int. Cl.
*H01J 5/16* (2006.01)
(52) U.S. Cl. ...................... 313/110; 313/113
(58) Field of Classification Search ......... 313/402–407, 313/110, 113
See application file for complete search history.

(56) References Cited

U.S. PATENT DOCUMENTS 5,850,271 A * 12/1998 Kim et al. .................... 349/111
2001/0026344 A1 * 10/2001 Sakamoto .................... 349/141

* cited by examiner

*Primary Examiner*—Vip Patel
(74) *Attorney, Agent, or Firm*—Burr & Brown

(57) ABSTRACT

A filter substrate including a transparent support substrate 11, a pattern layer 13, a first overcoat layer 15 formed of a reaction product prepared by a chemical reaction mainly based on hydrolysis of a starting material comprising at least a material selected from aminoalkcyldialkoxysilanes, aminoalkcyltrialkoxysilanes. and composites composed mainly of said compounds, and a first transparent inorganic thin-film layer 17 stacked on top of one another. The surface of the first transparent inorganic thin-film layer 17 has an Ra (average roughness) value of not more than 5 nm and an Rmax (maximum roughness) value of not more than 80 nm. A color display includes the filter substrate, and a transparent electrode layer, a luminescent layer, and a second electrode layer stacked in that order on the filter substrate. The filter substrate has excellent environmental resistance and does not adversely affect the luminance of the display.

14 Claims, 1 Drawing Sheet

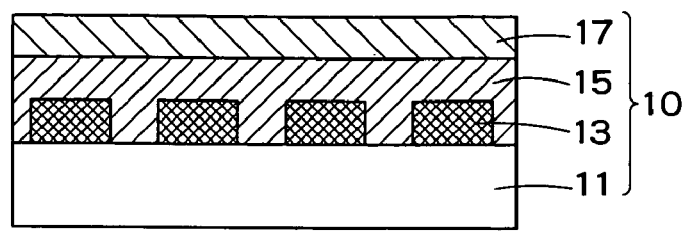
F I G. 1
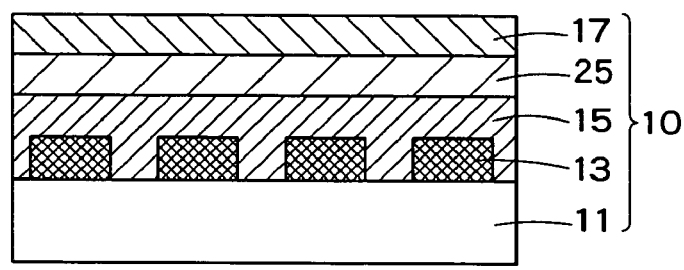
F I G. 2A
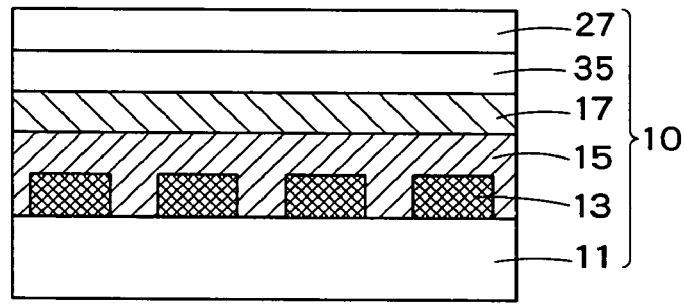
F I G. 2B
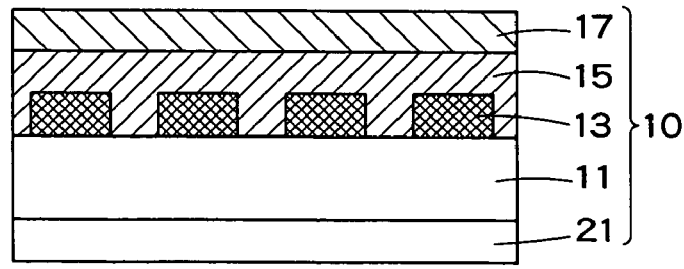
F I G. 3

FILTER SUBSTRATE AND COLOR DISPLAY USING THE SAME

TECHNICAL FIELD

The present invention relates to a filter substrate such as a color filter or a color conversion filter that can realize high-definition multicolor display. More particularly, the present invention relates to a filter substrate, which has excellent environmental resistance and, at the same time, can be easily produced at low cost, and a color display using the same.

The "ratio", "parts", "%", etc. as used herein in conjunction with formulation are by mass unless otherwise specified, and "/" represents the state of integral lamination.

"Shielding properties", "EL", "LCD", "PDP", and "panel" are abbreviation, functional expression, common name, or industrial term for "barrier properties", "electroluminescence", "liquid crystal display", "plasma display panel", and "element", respectively.

According to the definition of film and sheet in JIS K 6900, the sheet refers to a flat product that is thin and is generally small in thickness as compared with the length and width thereof, and the film refers to a thin flat product that is very small in thickness as compared with the length and width thereof and has an arbitrarily limited maximum thickness and is generally supplied as a roll. Accordingly, sheets having a particularly small thickness can be regarded as films. However, the boundary between the sheet and the film is not clear and cannot be clearly distinguished from each other without difficulties, and, thus, in the present specification, the "film" is defined as a term encompassing both the sheet and the film.

BACKGROUND ART

At the present time, various types of displays are used, and the practical use of various types of displays is studied. All of these displays except for cathode-ray tube types aim at a reduction in thickness. Further, there is an increasing demand for flexible types. Displays are installed for a long period of time and, in use, are exposed to severe environment conditions and, for example, undergo the influence of electric potential and temperature rise. Further, materials involved in luminescence or light modulation of displays cannot be said to have high chemical stability.

For example, for color displays using organic EL elements, when color display is provided using a luminous body, in general, three primary colors of blue, green, and red are obtained by changing the luminescent color of the luminescent body per se, or by using color filter layers and/or fluorescence conversion layers formed of fluorescent materials. Patterning (referred to as pixels) of EL elements of the three primary colors results in lowered efficiency of elements or suffers from a very complicated process, and, thus, mass production is difficult, and, at the same time, the cost is high.

For a dye- or pigment-colored resin film in the color filter layer and/or the fluorescence conversion layer, the presence of a small amount of moisture and /or organic component, which exists outside the element or stays or is contained in the element, adversely affects a luminescent element in a color display and is causative of lowered luminescence life and the occurrence of dark spots. Further, since the color filter layer and/or the color conversion layer are formed by patterning, a level difference among three primary color layers and minute projections at the edge of the patterns and the like exist, and concaves and convexes are present over the whole surface of the resin film. This poses a problem that defects and breaking occur in the electrode film and, consequently, the function as the display element cannot be provided.

What is required of the filter substrate used in the color display and the color conversion-type color display is that the filter substrate does not permit a significant level of permeation of moisture and/or organic component, possesses excellent environment resistance, does not adversely affect the luminescent element in a display, causes no significant level of lowering in luminescence life, and occurrence and growth of dark spots, is less likely to cause breaking of the electrode, is highly reliable, and, at the same time, can be easily produced and is low in cost.

It is known that a protective layer (an overcoat layer in the present invention) is provided in display elements from the viewpoint of shielding a fluorescent substance layer against moisture and the like (see, for example, Japanese Patent Laid-Open No. 219786/1999). In this case, however, an isocyanate-cured urethane resin, which is different from a material for a protective layer in the present invention (an overcoat layer in the present invention), is used as the protective layer.

Further, it is known that a protective layer (an overcoat layer in the present invention) is provided from the viewpoint of shielding a fluorescent substance layer against moisture and the like (see, for example, Japanese Patent Laid-Open No. 260562/1999). In this case, however, a heat- or ultraviolet-curing resin such as an acrylic resin, which is different from a material for a protective layer in the present invention (an overcoat layer in the present invention), is used as the protective layer.

Furthermore, it is known that a barrier layer is provided for shielding a fluorescent substance layer against moisture and the like. Examples of this technique known in the art include a method in which the thickness of the barrier layer is limited (see, for example, Japanese Patent Laid-Open No. 117976/2002) and a method in which oxynitride silicon having a limited composition is used in the barrier layer (see, for example, Japanese Patent Laid-Open No. 39468/2004). These publications, however, neither describe nor suggest materials for the protective layer.

Further, regarding materials for layers, materials equivalent to the material for the protective layer in the present invention are known (see, for example, Japanese Patent Laid-Open No. 295848/1996). However, the function of these materials contemplated in this publication is gas barrier properties, and this publication neither describes nor suggests the use of these materials for flattening.

SUMMARY OF THE INVENTION

The present invention has been made with a view to eliminating the above problems of the prior art, and an object of the present invention is to provide a filter substrate such as a color filters or a color conversion filter capable of realizing high-definition multi-color display and comprising a transparent support substrate and a pattern layer which is disposed in a desired pixel pattern, a first overcoat layer, and a first transparent inorganic thin-film layer stacked in that order on the transparent support substrate, whereby the surface of the first transparent inorganic thin-film layer is brought to an Ra (average roughness) value of not more than 5 nm and an Rmax (maximum roughness) of not more than 80 nm and, thus, the filter substrate does not permit a significant level of permeation of moisture and/or organic component (gas barrier properties), possesses excellent environment resistance, does not adversely affect the luminescent element in a display, causes no significant level of lowering in luminescence life, and occurrence and growth of dark spots, is less likely to cause breaking of the electrode, is highly reliable, and, at the same time, can be easily produced and is low in cost, and to provide a display using the same.

In order to attain the above object, the filter substrate according to a first aspect of the present invention is provided, comprising a transparent support substrate; a pattern layer in a desired pixel pattern form, a first overcoat layer, and a first transparent inorganic thin-film layer stacked in that order on the transparent support substrate wherein the first overcoat layer is partially or wholly formed of a reaction product prepared by a chemical reaction mainly based on hydrolysis of a starting material comprising at least a material selected from aminoalkyldialkoxysilanes, aminoalkyltrialkoxysilanes, and composites composed mainly of said compounds, the surface of said first transparent inorganic thin-film layer having an Ra (average roughness) value of not more than 5 nm and an Rmax (maximum roughness) value of not more than 80 nm.

According to a second aspect of the present invention, the filter substrate includes a second overcoat layer that is held between the first overcoat layer and the first transparent inorganic thin-film layer.

According to a third aspect of the present invention, a third overcoat layer and a second transparent inorganic thin-film layer are further provided in that order on the surface of the first transparent inorganic thin-film layer.

According to a fourth aspect of the present invention, a filter substrate is provided, comprising a transparent support substrate, and a pattern layer in a desired pixel pattern form, a first overcoat layer, a second overcoat layer, and a first transparent inorganic thin-film layer stacked in that order on the transparent support substrate, wherein at least the second overcoat layer is partially or wholly formed of a reaction product prepared by a chemical reaction mainly based on hydrolysis of a starting material comprising at least a material selected from aminoalkyldialkoxysilanes, aminoalkyltrialkoxysilanes, and composites composed mainly of said compounds.

According to a fifth aspect of the present invention, a filter substrate is provided, comprising a transparent support substrate, and a pattern layer in a desired pixel pattern form, a first overcoat layer, a first transparent inorganic thin-film layer, a second overcoat layer, and a second transparent inorganic thin-film layer stacked in that order on the transparent support substrate, wherein at least said third overcoat layer is partially or wholly formed of a reaction product prepared by a chemical reaction mainly based on hydrolysis of a starting material comprising at least a material selected from aminoalkyldialkoxysilanes, aminoalkyltrialkoxysilanes, and composites composed mainly of said compounds.

According to a sixth aspect of the present invention, the first transparent inorganic thin-film layer and/or the second transparent inorganic thin-film layer are formed of a material selected from silicon oxide, silicon nitride, silicon carbide, aluminum oxide, magnesium oxide, indium oxide, and composites composed mainly of said compounds, and the first transparent inorganic thin-film layer and/or the second transparent inorganic thin-film layer are a gas barrier layer.

According to a seventh aspect of the present invention, the transparent support substrate is formed of a transparent resin having a coefficient of linear expansion of not more than 80 ppm/K.

According to an eight aspect of the present invention, the pattern layer comprises a single type or plurality of types of color-patterned color filter layers formed by disposing a colored resin film on the transparent support substrate and patterning the resin film in a desired pattern, and said filter substrate is a color filter substrate.

According to a ninth aspect of the present invention, the pattern layer has a laminated structure comprising a single type or plurality of types of color-patterned color filter layers, formed by disposing a colored resin film on the transparent support substrate and patterning the resin film in a desired pattern, and a color conversion layer containing a fluorescent material and provided on said color filter layers, and said filter substrate is a color conversion filter substrate.

According to a tenth aspect of the present invention, a color display is provided, including the color filter substrate according to the eighth aspect, and further including at least a transparent electrode layer provided in one or a plurality of electrically independent regions, a luminescent material-containing luminescent layer, and a second electrode layer stacked in that order on the color filter substrate.

According to an eleventh aspect of the present invention, a color display is provided, including the color conversion filter substrate according to the ninth aspect, and further including at least a transparent electrode layer provided in one or a plurality of electrically independent regions, a luminescent material-containing luminescent layer, and a second electrode layer stacked in that order on the color conversion-type filter substrate.

The present inventors have made extensive and intensive studies on a filter substrate, for use in a color filter method or a color conversion method, which can prevent the occurrence and grown of detects such as dark spots, and on a color display using the filter substrate and, as a result, have aimed at the following two points as the cause of dark spots and the like.

The first point is that, for a dye- or pigment-colored resin film in the color filter layer and/or the fluorescence conversion layer, the presence of a small amount of moisture and/or organic component, which exists outside the element or stays or is contained in the element, adversely affects a luminescent element in a color display and is causative of lowered luminescence life and the occurrence of dark spots. The second point is that, since the color filter layer and/or the color conversion layer are formed by patterning, a level difference among three primary color layers and minute projections at the edge of the patterns and the like exist, and concaves and convexes are present over the whole surface of the resin film. This poses a problem that defects or breaking occurs in the electrode film and, consequently, the function as the display element cannot be provided.

Based on the above finding, the above problems could have been solved by providing an overcoat layer so as to flatten surface irregularities after the formation of the pattern layer from the viewpoint of reducing breaking of the electrode and, further, from the viewpoint of preventing the occurrence of dark spots, providing a transparent inorganic thin-film layer, preferably providing an overcoat layer having a flattening function and a transparent inorganic thin-film layer, which has gas barrier properties and is very even, in that order on the surface of a pattern layer as pixels provided on a transparent support substrate to shield moisture and/or organic component generated from the overcoat layer.

The first aspect of the resent invention provides a filter substrate that does not permit a significant level of permeation of moisture and/or organic component, possesses excellent environment resistance, does not adversely affect the luminescent element in a display, causes no significant level of lowering in luminescence life, and occurrence and growth of dark spots, and, in addition, is less likely to cause breaking of the electrode, is highly reliable, and, at the same time, can be easily produced and is low in cost.

The second to sixth aspects of the present invention provide a filter substrate that can further reduce the level of permeation of moisture and/or organic component, possesses excellent environment resistance, does not adversely affect the luminescent element in a display, causes no significant level of lowering in luminescence life, and occurrence and growth of dark spots, and, in addition, is much less likely to cause breaking of the electrode and is highly reliable.

The seventh aspect of the present invention provides a filter substrate which can be improved in dimensional stability necessary particularly in the formation of a high-definition pattern layer.

The eighth aspect of the present invention provides a filter substrate for a color filter that possesses excellent environment resistance, does not adversely affect the luminescent element in a display, causes no significant level of lowering in luminescence life, and occurrence and growth of dark spots, and, in addition, is less likely to cause breaking of the electrode, and is highly reliable.

The ninth aspect of the present invention provides a filter substrate for a color conversion filter that possesses excellent environment resistance, does not adversely affect the luminescent element in a display, causes no significant level of lowering in luminescence life, and occurrence and growth of dark spots, and, in addition, is less likely to cause breaking of the electrode, and is highly reliable.

The tenth aspect of the resent invention provides a color display using a color filter substrate that causes no significant level of lowering in luminescence life, and occurrence and growth of dark spots, and, in addition, is less likely to cause breaking of the electrode, and is highly reliable.

The eleventh aspect of the present invention provides a color display using a color conversion filter substrate that causes no significant level of lowering in luminescence life, and occurrence and growth of dark spots, and, in addition, is less likely to cause breaking of the electrode, and is highly reliable.

BRIEF DESCRIPTION OF THE DRAWINGS

FIG. 1 is a cross-sectional view of a filter substrate in one embodiment of the present invention;

FIG. 2 is a cross-sectional view of a filter substrate in one embodiment of the present invention;

FIG. 3 is a cross-sectional view of a filter substrate in one embodiment of the present invention.

DETAILED DESCRIPTION OF THE INVENTION

As shown in FIG. 1, the filter substrate according to the present invention includes a transparent support substrate 11, a pattern layer 13 as pixels, which is provided in a desired pattern on the substrate, a first overcoat layer 15 provided as a layer overlying the pattern layer, and a first transparent inorganic thin-film layer 17 provided on the first overcoat layer 15. Specifically, the filter substrate shown in FIG. 1 has a layer construction of transparent support substrate 11/pattern layer 13/first overcoat layer 15/first inorganic thin-film layer 17.

In the present invention, the provision of the first overcoat layer 15 having a flattening function on the surface of the pattern layer 13 followed by the provision of the first transparent inorganic thin-film layer 17 can realize a surface roughness Ra (average roughness) value of not more than 5 nm and an Rmax (maximum roughness) value of not more than 80 nm on the surface of the first transparent inorganic thin-film layer 17. As a result, the gas barrier properties for shielding moisture and/or organic component can be significantly improved, and the occurrence of dark spots can be prevented.

When the first transparent inorganic thin-film layer 17 is formed without providing the first overcoat layer 15 (flattening layer), the surface of the first transparent inorganic thin-film layer 17 is uneven and, thus, gas barrier properties are poor. Further, when the surface of the first transparent inorganic thin-film layer 17 is uneven, projections adversely affect the electrode layer formed thereon. That is, an overcurrent occurs in the projection part of the first transparent inorganic thin-film layer 17 due to electric field concentration. As a result, shortcircuiting occurs, resulting in the occurrence of dark spots. The occurrence of dark spots can be prevented by providing the first overcoat layer 15 (flattening layer) on the first transparent inorganic thin-film layer 17.

Preferably, the first overcoat layer 15 (flattening layer) is partially or wholly formed of a reaction product prepared by a chemical reaction mainly based on hydrolysis of a starting material comprising at least a material selected from aminoalkyldialkoxysilanes, aminoalkyltrialkoxysilanes, and composites composed mainly of said compounds, whereby the surface of the first transparent inorganic thin-film layer 17 on the first overcoat layer 15 (flattening layer) can be brought to a surface roughness Ra (average roughness) value of not more than 5 nm and an Rmax (maximum roughness) value of not more than 80 nm and, thus, the gas barrier properties can be improved and the occurrence of defects such as dark spots can be significantly reduced.

Further, preferably, as shown in FIG. 2(A), the interposition of a second overcoat layer 25 between the pattern layer 13 as pixels and the first overcoat layer 15, that is, the adoption of a layer construction of transparent support substrate 11/pattern layer 13/second overcoat layer 25/first overcoat layer 15/first inorganic thin-film layer 17, can realize further improved flattening and is effective in preventing the occurrence of defects such as dark spots.

Furthermore, as shown in FIG. 2(B), the adoption of a layer construction of transparent support substrate 11/pattern layer 13/first overcoat layer 15/first inorganic thin-film layer 17/third overcoat layer 35/second inorganic thin-film layer 27 can realize further improved flattening, can more effectively prevent the occurrence of defects such as dark spots, and further can contribute to improved gas barrier properties.

Further, in order that the stress on the front side and the stress on the back side are symmetrical, the adoption of an identical or substantially identical layer construction is preferred. When a layer construction as shown in FIG. 3, that is, stress relaxation layer 21/transparent support substrate 11/pattern layer 13/first overcoat layer 15/first inorganic thin-film layer 17, is adopted, the stress created in the case of the formation of layers on only one side of the substrate can be offset or relaxed. Therefore, for example, strains and warpage (also known as curving or curling) in post processing including heating can be prevented, and, thus, perpendicularity, dimensional accuracy, and dimensional accuracy in local parts can be improved.

(Transparent Support Substrate)

The transparent support substrate 11 according to the present invention should have good accuracy of dimensional stability necessary particularly for the formation of a high-definition pattern layer 13. The accuracy of dimensional stability is not more than about 1 ppm to 100 ppm/K, preferably not more than 1 ppm to 80 ppm/K, in terms of linear expansion coefficient.

For example, glass and transparent resin films may be mentioned as the material for the transparent support substrate 11. When a transparent glass substrate or a previously processed transparent glass substrate is used in a part or all the layers constituting the support substrate, both alkali glass and alkali-free glass may be used. When impurities pose a problem, the use of alkali-free glass, for example, Pyrex (registered trademark) glass, is preferred. Previously processed glass substrate may be, for example, transparent glass substrate subjected to a coating or step formation process. The film thickness of glass is preferably 30 μm to 2 mm; preferably 30 μm to 60 μm for use as a flexible substrate; and preferably 60 μm to 2 mm for use as a rigid substrate.

Examples of transparent resin films include films of poly (meth)acrylates (PARs), polyimides (PIs), polyamide-imides (PAIs), polyethersulfones (PESs), polycarbonates (PCs), cyclic polyolefin copolymers such as polynorbornenes, cyclic polyolefin resins, polycyclohexenes, polyether ketones (PEKs), polyetherether ketone (PEEKs), polyetherimides (PEIs), polysiloxane resins, ethylene-ethylene tetrafluoride copolymers (ETFEs), trifluorochloroethylene (PFAs), ethylene tetrafluoride-perfluoroalkylvinyl ether copolymers (FEPs), polyvinylidene fluorides (PVDFs), polyvinyl fluorides (PVFs), perfluoroethylene-perfluoropropylene-perfluorovinyl ether copolymers (EPAs) or other fluororesins. Further, the material for the transparent resin film may be composed mainly of a resin, and examples thereof include resin-impregnated reinforcing materials such as polyepoxide-impregnated glass cloth.

(First Transparent Inorganic Thin-Film Layer)

The first transparent inorganic thin-film layer 17 is provided to prevent the permeation of water vapor or oxygen. Further, in order to prevent stress-derived peeling of the film in a laminate of the assembly and a transparent electrically conductive layer provided thereon, the first transparent inorganic thin-film layer 17 is interposed between the transparent electrically conductive layer and the first overcoat layer 15 for realizing strong adhesion between the transparent layer and the first overcoat layer 15. When a third overcoat layer 35 is provided on the first overcoat layer 15, the first transparent inorganic thin-film layer 17 is provided between the first overcoat layer 15 and the third overcoat layer 35 to improve the adhesion between the first overcoat layer 15 and the third overcoat layer 35. The first transparent inorganic-thin-film layer 17 may be formed of a material having a gas barrier property, and examples thereof include: oxides such as silicon oxide, aluminum oxide, magnesium oxide, indium oxide, calcium oxide, zirconium oxide, titanium oxide, boron oxide, zinc oxide, ceric oxide, hafnium oxide, and barium oxide; nitrides such as silicon nitride, aluminum nitride, boron nitride, and magnesium nitride; carbides such as silicon carbide; sulfides; and the like.

Further, composites of two or more materials selected from the above materials, for example, oxynitrides, and carbon-containing materials, for example, oxycarbides, inorganic carbonitrides, and inorganic oxycarbonitrides may also be applied.

Specific examples thereof include inorganic oxides represented by formula $MO_x$, inorganic nitrides represented by formula $MN_y$, inorganic carbides represented by formula $MC_z$, inorganic oxycarbides represented by formula $MO_xC_z$, inorganic carbonitrides represented by formula $MN_yC_z$, inorganic oxynitrides represented by formula $MO_xN_y$, and inorganic oxycarbonitrides represented by formula $MO_xN_yC_z$, wherein M preferably represents a metal element such as Si (silicon), Al (aluminum), or Ti (titanium).

The first transparent inorganic thin-film layer 17 may be formed, for example, by vacuum deposition, sputtering, or ion plating, or by thermal CVD or plasma CVD. These methods are selected by taking into consideration, for example, the type of the substrate and the underlying overcoat layer 15, and the transparent inorganic thin-film layer 17, the type of the film forming material, easiness of film formation, and process efficiency.

The thickness of the first transparent inorganic thin-film layer 17 is preferably 10 to 500 nm. When the thickness is less than 10 nm, gas shielding properties as the substrate for displays are unsatisfactory. On the other hand, when the thickness exceeds 500 nm, the stress of the first transparent inorganic thin-film layer 17 per se is increased, resulting in deteriorated flexibility. Further, in this case, due to abnormal grain growth, projections are formed, and, consequently, disadvantageously, Rmax is likely to be increased.

(First Overcoat Layer)

The first overcoat layer 15 is provided on a pattern layer as pixels which has been formed in a desired pattern on the substrate, from the viewpoint of lowering surface Ra and Rmax. The overcoat layer can be regarded as a flattening layer which has the function of reducing the level difference created by the pattern layer. A part or the whole of the material constituting the first overcoat layer 15 is selected from aminoalkyldialkoxysilanes, aminoalkyltrialkoxysilanes, and composites composed mainly of the compounds. When a part or the whole of the overcoat layer is formed of a reaction product prepared by a chemical reaction mainly based on hydrolysis of the composite (hereinafter referred to as "hydrolysate of aminoalkyldialkoxysilane or the like"), the layer has good affinity for and wettability by resins and inorganic compounds. Therefore, the first overcoat layer 15 can fill and cover defects of pores, concaves, cracks and the like for sealing. Further, by virtue of good leveling properties, when the detects are filled and covered with the first overcoat layer 15 followed by drying, the surface is smooth. Ultra-flattening function can be exerted by synergistic effect of the affinity and the leveling properties.

In general, the overcoat layer refers to the uppermost surface layer. In the present specification, however, in some cases, a layer(s) is further stacked on the overcoat layer, and, hence, the overcoat layer encompasses a layer provided between layers.

The flattening is carried out to a level of Ra (average roughness) of not more than 5 nm and Rmax (maximum roughness) of not more than 80 nm. The lower limit of the center line average roughness Ra is not particularly limited. From a practical standpoint, however, the lower limit of the center line average roughness Ra is not less than 0.01 nm. This significantly can reduce defects such as dark spots.

In the prior art technique, a method may be used in which the transparent support base material 11 or the transparent electrode is previously polished for improving the smoothness. The present invention can eliminate the need to provide these steps.

The overcoat layer 15 may be formed, by a conventional method, such as by dry process, such as sputtering, ion plating, or CVD, or wet process, such as spin coating, roll coating, or casting.

Japanese Patent Laid-Open No. 3206/1995 and Japanese Patent Laid-Open No. 18221/1995 describe use of the above alkoxysilane compounds. In these publications, however, alkoxysilane compounds are used for imparting gas shielding functions by coating on any desired plastic film. That is, the purpose of use of alkoxysilane compounds in the above publications, which is to impart gas shielding properties, is different from the purpose of use of alkoxysilane compounds in the present invention as an overcoat layer 15 which is to improve the flatness of color filters.

Further, it should be noted that, when sol gel coating agents as described in Japanese Patent No. 3438266 and Japanese Patent No. 3438267 are used, only unsatisfactory flatness is achieved. The present inventors have found that, only when aminoalkyldialkoxysilanes or aminoalkyltrialkoxysilanes are contained, satisfactory flatness is achieved.

(Second Transparent Inorganic Thin-Film Layer)

The second transparent inorganic thin-film layer 27 has the function of preventing the permeation of water vapor, oxygen or the like, as well as the effect of further improving the flatness.

The second transparent inorganic thin-film layer 27 is preferably formed of a material that is identical to the material used for the first transparent inorganic thin-film layer 17. Examples of materials usable herein include silicon oxide, silicon nitride, silicon carbide, aluminum oxide, magnesia oxide, and indium oxide, or composites of two or more materials selected from the above materials. Among others, silicon oxide is preferred because it can form a film that is highly transparent and has gas shielding properties. On the other hand, silicon nitride is also preferred because it can form a film that has a higher level of gas shielding properties. Particularly preferably, a composite composed of silicon oxide and silicon nitride is preferred. When the content of silicon oxide is high, the transparency is increased while, when the content of silicon nitride is high, the level of gas shielding properties is increased.

The thickness of the second transparent inorganic thin-film layer 27 is preferably not less than 10 nm and not more than 500 nm. When the thickness is less than 10 nm, the level of gas shielding properties as the substrate for displays is unsatisfactory. On the other hand, when the thickness is more than 500 nm, the flexibility of the layer is deteriorated. Further, in this case, due to abnormal grain growth, projections are formed, leading to a fear of causing increased Rmax.

(Second and Third Overcoat Layers)

The second overcoat layer 25, the third overcoat layer 35, and the nth overcoat layer may be formed of a material that is the same as or similar to the material for the first overcoat layer 15. The material, however, is not limited to this only.

In this connection, it should be noted that, for the overcoat layer specified in claims 4 and 5, it is needless to say that a part or the whole of the material is a hydrolysate of aminoalkyldialkoxysilanes or the like (a material selected from aminoalkyldialkoxysilanes, aminoalkyltrialkoxysilanes, and composites composed mainly of the compounds. A part or the whole of the overcoat layer is formed of a reaction product prepared by a chemical reaction mainly based on hydrolysis of the composite).

Other materials for the overcoat layer include materials composed mainly of modified polyvinyl alcohol resins, preferably modified polyvinyl alcohol resins having a silicon atom in its structure, and materials composed mainly of one or a plurality of them may be used. The modified polyvinyl alcohol resin having a silicon atom in its structure may be any modified polyvinyl alcohol resin so far as it contains a silicon atom in its molecule. In particular, modified polyvinyl alcohol resins in which the silicon atom contained in its molecule contains a reactive substituent such as an alkoxy group, an acyloxyl group, or a hydrolysate thereof, a silanol group, or a salt thereof are preferred from the viewpoint of adhesion to the base material and the gas barrier film.

The modified polyvinyl alcohol resin having a silicon atom in its structure may be produced by various methods. A specific example of a method for producing the modified polyvinyl alcohol resin having a silicon atom in its structure is to introduce a silicon atom into polyvinyl alcohol, or a polyvinyl alcohol resin, such as a saponification product of an ethylene-vinyl acetate copolymer, or a modification product thereof using a silylation agent by post modification.

A saponified polyvinyl alcohol in which the saponification value of the acetyl group in the polyvinyl acetate is not less than 98% by mole may be used as the polyvinyl alcohol.

Saponification products of ethylene-vinyl acetate copolymers include saponification products of ethylene-vinyl acetate copolymers having a vinyl acetate content of 79 to 92% by mole and saponification products of ethylene-vinyl acetate copolymers having an ethylene content of 25 to 50% in which the acetyl group has been substantially completely saponified.

Thus, when the formation of the overcoat layer and the formation of the transparent inorganic thin-film layer are repeated once to n times, the flatness can be enhanced and, in addition, the level of gas barrier properties can be improved. Even though local defects are present in the underlying film (layer), when the overcoat layer is interposed, since the film is discontinuously grown, continuity of the defect can be eliminated. Accordingly, the deterioration in barrier properties and the presence of abnormal projections can be suppressed. Even though there are defects, the probability of occurrence of detects in the same place in a superimposed state is very low. Repetition of stacking of the flattening layer (overcoat layer) and the transparent inorganic thin-film layer in that order on the transparent inorganic compound layer once to five times is preferred from the viewpoint of imparting a high level of water vapor barrier properties and oxygen barrier properties. Further, regulation of coating conditions so as to offset the stress can prevent strains, warpage and the like.

Layer constructions include, for example, substrate 11/pattern layer 13/first overcoat layer 15/first inorganic thin-film layer 17, substrate 11/pattern layer 13/first overcoat layer 15/first inorganic thin-film layer 17/third overcoat layer 35/second inorganic thin-film layer 27, substrate 11/pattern layer 13/first overcoat layer 15/first inorganic thin-film layer 17/third overcoat layer 35/second inorganic thin-film layer 27/fourth overcoat layer/third inorganic thin-film layer, substrate 11/pattern layer 13/first overcoat layer 15/first inorganic thin-film layer 17/third overcoat layer 35/second inorganic thin-film layer 27/fourth overcoat layer/third inorganic thin-film layer/nth overcoat layer/nth inorganic thin-film layer, substrate 11/pattern layer 13/first overcoat layer 15/second overcoat layer 25/first inorganic thin-film layer 17, and substrate 11/pattern layer 13/first overcoat layer 15/second overcoat layer 25/first inorganic thin-film layer 17/third overcoat layer 35/second inorganic thin-film layer 27. The layer construction, however, is not limited to these only so far as the layer construction includes at least one pair of overcoat layer/inorganic thin-film layer.

When a plurality of overcoat layers are provided, preferably, the layer which is to be partially or wholly formed of a hydrolysate of an aminoalkyldialkoxysilane or the like (a material selected from aminoalkyldialkoxysilanes, aminoalkyltrialkoxysilanes, and composites composed mainly of the compounds, and a part or the whole of the overcoat layer is formed of a reaction product prepared by a chemical reaction mainly based on hydrolysis of the composite) is as follows.

When the layer construction comprises the first overcoat layer 15 and the second overcoat layer 25, most preferably, the two layers in total of the the first overcoat layer 15 and the second overcoat layer 25 are formed of the above specified material. Next-most preferably, one layer of the second overcoat layer 25 is formed of the above specified material. Next-preferably, one layer of the first overcoat layer 15 is formed of the above specified material.

When the layer construction comprises the first overcoat layer 15 to the nth (wherein n is 3 or more) overcoat layer, most preferably, all the overcoat layers of the first overcoat layer 15 to the nth overcoat layer are formed of the above specified material. Next-most preferably, one layer of the nth overcoat layer is formed of the above specified material. Next-preferably, one layer of the (n−1)th overcoat layer is formed of the above specified material. Next-preferably, one layer of the (n−2)th overcoat layer is formed of the above specified material.

Specifically, when a plurality of overcoat layers are provided, the overcoat layer which is the farthest from the substrate 11 may be formed of a hydrolysate of an aminoalkyldialkoxysilane or the like. It is a matter of course that, more preferably, a plurality of overcoat layers selected in the order of layers farther from the substrate 11 are formed of a hydrolysate of an aminoalkyldialkoxysilane or the like, and, most preferably, as described above, all the overcoat layers are formed of a hydrolysate of an aminoalkyldialkoxysilane or the like.

In this case, a material composed mainly of a modified polyvinyl alcohol resin may be used as the material for overcoat layers other than the overcoat layer(s) to be formed of a hydrolysate of an aminoalkyldialkoxysilane or the like.

According to the above construction, gas barrier properties can be exhibited with higher efficiency. Therefore, the level of permeation of moisture and/or organic component is low, the environment resistance is excellent, the luminescent element in a display is not adversely affected, no significant level of lowering in luminescence life takes place, and occurrence and growth of dark spots are not significant, breaking of the electrode is less likely to occur, and the reliability can be enhanced.

(Symmetrical Layer Construction)

When a transparent resin film, a thin-film glass or the like is used as the transparent support base material 11, the layer construction on one side of the substrate is preferably identical or similar to the layer construction on the other side on the substrate so that the stress of the front surface is identical to the stress of the back surface. Specifically, as shown in FIG. 3, when a layer such as an overcoat layer or a transparent inorganic thin-film layer (a stress relaxation layer 21) is also formed on the opposite side, stress created in the formation of the films only on one side of the substrate can be offset or relaxed and, consequently, for example, strains and warpage (also known as curving or curling) in a post processing process including heating can be prevented. Therefore, perpendicularity, dimensional accuracy, and dimensional accuracy in local parts can be improved. Further, for example, troubles involved in alignment at the time of necessary patterning, for example, in a post process of electrode formation can be eliminated. Further, bias of flexibility can be eliminated, and, thus, troubles in use can be eliminated.

Further, at the same time, since declassification in the opposite side of the support base material can be prevented, dense, even-thickness, and good-quality transparent gas shielding films can be stably formed.

When a transparent inorganic compound layer is also formed on the opposite side, more preferably, for example, the thickness of the layer to be formed, the inorganic material used, and layer construction are taken into consideration for stress offsetting or relaxation purposes.

The stress relaxation layer 21 formed on the opposite side of the substrate is not particularly limited. Preferably, however, the material for the transparent inorganic thin-film layer and the overcoat layer and the like may be used.

The material for the transparent inorganic thin-film layer is not limited to silicon oxide, silicon nitride, and composites thereof, and any desired transparent inorganic compound such as aluminum oxide or indium oxide may be used. Among the above-described compounds, silicon oxide, silicon nitride and composites thereof are preferred. The material for the overcoat layer may be the same as those used in the above overcoat layers.

(Pattern Layer)

The pattern layer 13 is a single or plurality of types of color filter layers formed by forming a resin film disposed in a desired pattern on the transparent support substrate 11, or a laminate of the color filter layer(s) and a color conversion layer.

A pattern of the color filter layer, and a pattern of the color filter layer and the color conversion layer may be present as a mixture in a plurality of patterns constituting the pattern layer 13.

(Color Filter Layer)

Preferably, a single or plurality of types of color filter layers are formed in a pattern form in the filter substrate 10 according to the present invention to constitute pixels. For example, a red color filter layer, a green color filter layer, a blue color filter layer, and a black matrix layer formed of two layers of chromium/chromium oxide (not shown) between the color filter layers (pixels) may be formed.

(Color Conversion Layer)

The color conversion layer comprises organic fluorescent coloring material and a matrix resin.

(Organic Fluorescent Coloring Material)

The organic fluorescent coloring material contained in the color conversion layer absorbs light in a near-ultraviolet region or visible region emitted from a luminous body, particularly light in a blue or blue-green region and emits visible light with different wavelengths as fluorescence. Preferably, at least one fluorescent coloring material which emits fluorescence in at least a red region is used in combination with at least one fluorescent coloring material which emits fluorescence in a green region.

Specifically, when an organic EL luminescent element which emits light in a blue or blue-green region is used as a light source, an attempt to obtain light in a red region by passing light from the element through a mere red filter layer disadvantageously causes very dark output light because the quantity of light with wavelengths in a red region is originally small. Accordingly, light in a red region having satisfactory intensity can be output by converting light in a blue to blue-green region emitted from the element to light in a red region by using a fluorescent coloring material.

On the other hand, as with the light in a red region, regarding light in a green region, before outputting, light emitted from the element may be converted to light in a green region by different organic fluorescent coloring material. Alternatively, when light emitted from the element contains a satisfactory amount of light in a green region, light emitted from the element as such may be simply passed through a green color filter layer for outputting. Further, regarding light in a blue region, light emitted from an organic EL luminescent element may be converted by using fluorescent coloring material before the light is output. More preferably, however, the light emitted from the organic EL luminescent element is passed through a mere blue color filter layer before outputting.

Examples of the fluorescent coloring material, which absorbs light, emitted from an organic EL luminescent element, in a blue to blue-green region and emits fluorescence in a red region, include rhodamine dyes such as rhodamine B, rhodamine 6G, rhodamine 3B, rhodamine 101, rhodamine 110, sulforhodamine, basic violet 11, and basic red 2, cyanine dyes, pyridine dyes such as 1-ethyl-2-[4-(p-dimethylaminophenyl)-1,3-butadienyl]-pyridinium perchlorate (pyridine 1), or oxazine dyes. Further, various dyes (for example, direct dyes, acid dyes, basic dyes, and disperse dyes) may also be used so far as they exhibit fluorescence.

Examples of the fluorescent coloring material which absorbs light, emitted from a luminescent body, in a blue to blue-green region and emits fluorescence in a green region include coumarin dyes such as 3-(2'-benzothiazolyl)-7-diethylaminocoumarin (coumarin 6), 3-(2'-benzoimidazolyl)-7-N,N-diethylaminocoumarin (coumarin 7), 3-(2'-N-methylbenzoimidazolyl)-7-N,N-diethylaminocoumarin (coumarin 30), 2,3,5,6-1H,4H-tetrahydro-8-trifluoromethylquinolizine (9,9a,1-gh)coumarin (coumarin 153), or basic yellow 51 as a kind of coumarin dye, and naphthalimide dyes such as solvent yellow 11 and solvent yellow 116. Further, various dyes (for example, direct dyes, acid dyes, basic dyes, and disperse dyes) may also be used so far as they exhibit fluorescence.

(Organic Fluorescent Pigment)

The organic fluorescent coloring material used in the present invention may be previously incorporated, for example, in a polymethacrylic ester, polyvinyl chloride, a vinyl chloride-vinyl acetate copolymer resin, an alkyd resin, an aromatic sulfonamide resin, a urea resin, a melamine resin, a benzoguanamine resin, or a resin mixture thereof for pigment formation to prepare an organic fluorescent pigment. These organic fluorescent coloring material and organic fluorescent pigments (which, in the specification, are collectively referred to as organic fluorescent coloring material) may be used either solely or in a combination of two or more for fluorescence hue regulation purposes.

The amount of the organic fluorescent coloring material used in the present invention contained in the color conversion layer is 0.01 to 5% by weight, more preferably 0.1 to 2% by weight, based on the weight of the color conversion layer. When the content of the organic fluorescent coloring material is less than 0.01% by weight, satisfactory wavelength conversion cannot be realized. On the other hand, when the content of the organic fluorescent coloring material exceeds 5%, color conversion efficiency is lowered due to concentration quenching or other effect.

(Matrix Resin)

Next, in the present invention, the matrix resin used in the color conversion layer is prepared by subjecting a photocurable or photothermally curable resin (resist) to light and/or heat treatment to generate radical species or ion species for polymerization or crosslinking to render the resin insoluble and infusible. For patterning of the color conversion layer, the photocurable or photothermally curable resin which is in an unexposed state, is preferably soluble in an organic solvent or an alkali solution.

Specifically, the photocurable or photothermally curable resin comprises (1) a composition comprising an acrylic polyfunctional monomer and oligomer containing a plurality of acryloyl or methacryloyl groups and a photopolymerization initiator or a thermal polymerization initiator, (2) a composition comprising a polyvinylcinnamic ester and a sensitizer, (3) a composition comprising a chain or cyclic olefin and bisazide, and (4) a composition comprising an epoxy-containing monomer and an acid generating agent. In particular, the resin (1) comprising an acrylic polyfunctional monomer and oligomer and a photopolymerization initiator or a thermal polymerization initiator is preferred because high-definition patterning is possible and reliability in terms of solvent resistance, heat resistance and the like is on a high level. As described above, light and/or heat are applied to a photocurable or photothermally curable resin to form a matrix resin.

The photopolymerization initiator, the sensitizer, and the acid generating agent which may be used in the present invention are preferably those that can initiate polymerization upon exposure to light with wavelengths not absorbed by fluorescence conversion coloring material contained in the resin. In the color conversion layer in the filter substrate according to the present invention, when the resin per se in the photocurable or photothermally curable resin is polymerizable upon exposure to light or heat, the photopolymerization initiator and the thermal polymerization initiator may not be added.

The matrix resin is formed by providing a solution or dispersion containing a photocurable or photothermally curable resin and organic fluorescent coloring material, coating the solution or dispersion onto a support substrate 11 to form a resin layer, and exposing the photocurable or photothermally curable resin in its desired parts for polymerization. After exposure of desired parts in the photocurable or photothermally curable resin to render these parts insoluble, patterning is carried out. The patterning may be carried out by a conventional method, for example, a method in which the resin in its unexposed parts is removed by an organic solvent or an alkali solution which can dissolve or disperse the unexposed resin.

The following Examples and Comparative Examples further illustrate the present invention. However, it should be noted that the present invention is not limited to these Examples only.

EXAMPLES

Example 1

(1) Formation of Blue Color Filter Layer

A 200 μm-thick sheet-like (30 cm×21 cm) (meth)acrylic resin film having a coefficient of linear expansion of 60 ppm/K and a total light transmittance of 86% was used as a transparent support substrate 11. The (meth)acrylic resin film is one formed by forming a film using a resin composition comprising 94 parts by weight of an alicyclic structure-containing bis(meth)acrylate and 6 parts by weight of an alicyclic structure-containing bis(mono)acrylate.

A blue color filter material (COLOR MOSAIC®CB-7001: tradename, manufactured by Fuji-Hunt Electronics Technology Co., Ltd.) was spin coated on the (meth)acrylic resin film. The coating film was patterned by photolithography to form a blue color filter layer with a stripe pattern having a line width of 0.1 mm, a pitch (cycle) of 0.33 mm, and a film thickness of 6 μm.

(2) Formation of Green Color Conversion Layer

Coumarin 6 (0.7 part by weight) as a fluorescent coloring material was dissolved in 120 parts by weight of propylene glycol monoethyl acetate (PEGMA) as a solvent. 100 parts by weight of a photopolymerizable resin (V259PA/P5: tradename, manufactured by Shin Nittetu Kasei Kogyo K.K.) was added to the solution to prepare a coating solution.

The coating solution was spin coated onto the transparent support substrate with the blue color filter layer formed thereon prepared in the above step, and patterning was carried out by photolithography to form a green color conversion layer with a stripe pattern having a line width of 0.1 mm, a pitch (cycle) of 0.33 mm, and a film thickness of 10 μm.

(3) Formation of Red Color Conversion Layer

Coumarin 6 (0.6 part by weight) as a fluorescent coloring material, rhodamine 6G (0.3 part by weight), and basic violet 11 (0.3 part by weight) were dissolved in 120 parts by weight of propylene glycol monoethyl acetate (PEGMA) as a solvent. 100 parts by weight of a photopolymerizable resin (V259PA/P5: tradename, manufactured by Shin Nittetu Kasei Kogyo K.K.) was added to the solution to prepare a coating solution.

The coating solution was spin coated onto the transparent support substrate with the blue color filter layer and the green color conversion layer formed thereon, and patterning was carried out by photolithography to form a red color conversion layer with a stripe pattern having a line width of 0.1 mm, a pitch (cycle) of 0.33 mm, and a film thickness of 10 μm.

Line patterns of the red color conversion layer, the green color conversion layer, and the blue color filter layer were disposed parallel to each other at spacings of 0.01 mm to constitute the color conversion layers.

The red color conversion layer, the green color conversion layer, and the blue color filter layer correspond to the pattern layer 13.

(4) Formation of First Overcoat Layer 15

1-Ethyliminopropyltrimethoxysilane as the amino-containing alkoxysilane compound was spin coated onto the color conversion layers formed in the above step, and the coating was heated at 160° C. for one hr to form a flattening layer as an overcoat layer. The overcoat layer had a thickness of 8 μm on the color conversion layers.

(5) Formation of First Transparent Inorganic Thin-Film Layer 17

The substrate with the first overcoat layer 15 provided thereon in the above step was disposed within a chamber in a magnetron sputtering device. Silicon nitride was used as the target. Under the following film formation conditions, a silicon oxynitride film was formed to a thickness of 100 nm as a first transparent inorganic thin-film layer 17. Thus, a filter substrate of Example 1 was prepared.

Film formation conditions; film formation pressure: $2.5 \times 10^{-1}$ Pa, argon gas flow rate: 20 sccm, nitrogen gas flow rate: 9 sccm, frequency: 13.56 MHz, and electric power: 1.2 kW.

Example 2

The procedure of Example 1 was repeated, except that a glass plate having a size of 6 in. square, a thickness of 0.7 mm, and a total light transmittance of 87% was used as a transparent support substrate 11. Thus, a filter substrate of Example 2 using glass as the transparent support substrate was prepared.

Example 3

A filter substrate of Example 3 was prepared in the same manner as in Example 1, except that, after the formation of the first overcoat layer 15, a second overcoat layer 25 was further formed on the first overcoat layer 15. The second overcoat layer 25 was formed under the same coating conditions as used in the formation of the first overcoat layer 15.

Example 4

A filter substrate of Example 4 was prepared in the same manner as in Example 2, except that a third overcoat layer 35 and a second transparent inorganic thin-film layer 27 were formed in that order on the first transparent inorganic thin-film layer 17. The second transparent inorganic thin-film layer 27 was formed under the same film formation conditions as used in the formation of the first transparent inorganic thin-film layer 17, and the third overcoat layer 35 was formed under the same coating conditions as used in the formation of the first overcoat layer 15.

Example 5

A filter substrate of Example 5 was prepared in the same manner as in Example 1, except that a 100 nm-thick film of silicon oxynitride was formed as a stress relaxation layer 21 for relaxing the stress and preventing declassification on the transparent support substrate 11 on its side (backside) remote from the pattern layer 13 (red color conversion layer, green color conversion layer, and blue color filter layer). The stress relaxation layer 21 was formed under the same film formation conditions as used in the formation of the first transparent inorganic thin-film layer 17.

Example 6

A transparent electrode (indium zinc oxide) film was formed by sputtering on the whole area of the filter substrate (color conversion filter substrate) of Example 1. A resist material (OFRP-800: tradename, manufactured by Tokyo Ohka Kogyo Co., Ltd.) was coated on the indium zinc oxide. The coating was then patterned by photolithography to form a transparent electrode layer with a stripe pattern having a width of 0.094 mm, a spacing of 0.016 mm, and a layer thickness of 100 nm at positions of fluorescent conversion layers of respective colors.

The color conversion filter substrate with the transparent electrode layer formed thereon was placed within a resistance heating type vapor deposition apparatus, and a hole injection layer, a hole transport layer, an organic luminescent layer, and an electron injection layer were formed in that order on the whole surface of the underlying layer without breaking a vacuum. In the film formation, the internal pressure of the vacuum chamber was reduced to $1 \times 10^{-4}$ Pa. The hole injection layer was formed by stacking copper phthalocyanine (CuPc) to a film thickness of 100 nm. The hole transport layer was formed by stacking 4,4'-bis[N-(1-naphthyl)-N-phenylamino]biphenyl (α-NPD) to a film thickness of 20 nm. The organic luminescent layer was formed by stacking 4,4'-bis(2, 2'-diphenylvinyl)biphenyl (DPVBi) to a film thickness of 30 nm. The electron injection layer was formed by stacking aluminum chelate (tris(8-hydroxyquinoline) aluminum complex, Alq) to a film thickness of 20 nm.

Next, without breaking vacuum, a cathode of a 200 nm-thick Mg/Ag (mass ratio=10/1) layer was formed using a mask for forming a pattern having a width of 0.30 mm and a spacing of 0.03 mm orthogonal to the stripe pattern of the anode (transparent electrode layer). The organic EL luminescent element thus obtained was placed in a glove box, and, in a dry nitrogen atmosphere (oxygen concentration and water concentration: each not more than 10 ppm) in the glove box, sealing was carried out using a sealing glass and a UV curing adhesive to prepare an organic EL color display of Example 6 having a six-layer structure of filter substrate of Example 1 (first inorganic thin-film layer face)/transparent electrode layer/hole injection layer/hole transport layer/organic luminescent layer/electron injection layer/cathode.

Example 7

An organic EL color display of Example 7 was prepared in the same manner as in Example 6, except that the filter substrate of Example 2 was used.

Example 8

An organic EL color display of Example 8 was prepared in the same manner as in Example 6, except that the filter substrate of Example 3 was used.

Example 9

An organic EL color display of Example 9 was prepared in the same manner as in Example 6, except that the filter substrate of Example 4 was used.

Example 10

An organic EL color display of Example 10 was prepared in the same manner as in Example 6, except that the filter substrate of Example 5 was used.

Comparative Example 1

A filter substrate (a color conversion filter substrate) of Comparative Example 1 was prepared in the same manner as in Example 1, except that the first covercoat layer 15 was formed by providing a coating agent comprising tetraethylorthosilicate as a main agent, spin coating the coating agent, and drying the coating on a hot plate at 120° C. for 2 min and then in a drier at 160° C. for one hr to form an about 8 μm-thick first overcoat layer 15.

Comparative Example 2

A filter substrate (a color conversion filter substrate) of Comparative Example 2 was prepared in the same manner as in Example 2, except that the first covercoat layer 15 was formed by providing a coating agent comprising tetraethylorthosilicate as a main agent, spin coating the coating agent, and drying the coating on a hot plate at 120° C. for 2 min and then in a drier at 160° C. for one hr to form an about 8 μm-thick first overcoat layer 15.

Comparative Example 3

A filter substrate (a color conversion filter substrate) of Comparative Example 3 was prepared in the same manner as in Example 2, except that the first overcoat layer 15 (flattening layer) was not formed.

Comparative Example 4

An organic EL color display of Comparative Example 4 was prepared in the same manner as in Example 6, except that the filter substrate of Comparative Example 1 was used.

Comparative Example 5

An organic EL color display of Comparative Example 5 was prepared in the same manner as in Example 6, except that the filter substrate of Comparative Example 2 was used.

Comparative Example 6

An organic EL color display of Comparative Example 6 was prepared in the same manner as in Example 6, except that the filter substrate of Comparative Example 3 was used.

(Evaluation)

For the organic EL color displays of Examples 6 to 10 and Comparative Examples 4 to 6, after continuous driving for 100 hr, the number of dark spots per unit area within the color display panel was visually determined under an optical microscope (magnification: 10 times). The results of measurement are shown in Table 1.

Ra (center line average roughness) and Rmax (maximum roughness) were determined with an atomic force microscope (Nanopics, manufactured by Seiko Instruments Inc.) in a 20 μm range.

TABLE 1

| Item Unit | | Number of dark spots/$cm^2$ | Ra nm | Rmax nm |
|---|---|---|---|---|
| Example | 6 | 39 | 0.8 | 79 |
| | 7 | 4 | 0.6 | 42 |
| | 8 | 8 | 0.6 | 50 |
| | 9 | 1 | 0.4 | 18 |
| | 10 | 30 | 0.8 | 66 |
| Comparative Example | 4 | 194 | 0.8 | 216 |
| | 5 | 156 | 1.4 | 184 |
| | 6 | Light not emitted | 2.5 | 346 |

(Results of Evaluation)

For both Examples 6 and 10, Ra was not more than 5 nm, Rmax was not more than 80 nm, and the number of dark spots was not more than 39/$cm^2$. That is, the products of Examples of 6 and 10 had no problem as color displays.

In particular, for all of Examples 7 to 9, Ra was not more than 0.6 nm, and Rmax was not more than 50 nm. That is, ultra-flattening could be realized. The number of dark spots was not more than 8/$cm^2$. That is, the products of Examples 7 to 9 were excellent as the color display. Therefore, the display substrates of Examples 1 to 5 suffered from no problem.

For Comparative Examples 4 and 5, Ra was not more than 5 nm. However, Rmax was large and 216 nm and 184 nm, and the number of dark spots was also large and 194 and 156/$cm^2$. That is, the products of Comparative Examples 4 and 6 could not be put to practical use as color displays.

For Comparative Example 6, Ra was not more than 5 nm. However, Rmax was large and 346 nm, and breaking of electrode lines occurs. Therefore, the panel per se did not emit light, and display was impossible at all.

INDUSTRIAL APPLICABILITY

According to the present invention, a highly reliable filter substrate, which does not permit a significant level of permeation of moisture and organic component and causes no significant level of lowering in luminescence life and occurrence and growth of dark spots, can easily be produced at low cost.

This filter substrate is particularly suitable for use, for example, as filter substrates such as color filters and color conversion filters capable of realizing high-definition multicolor display, and displays using the filter substrate.

The invention claimed is:

1. A color conversion filter substrate comprising:
   a transparent support substrate; and
   a pattern layer in a desired pixel pattern form, a first overcoat layer, and a first transparent inorganic thin-film layer stacked in that order on a surface of the transparent support substrate;
   wherein the first overcoat layer is at least partially formed of a reaction product prepared by a chemical reaction mainly based on hydrolysis of a starting material comprising at least one material selected from the group consisting of aminoalkyldialkoxysilanes, aminoalkyltrialkoxysilanes, and composites thereof;

wherein a surface of the first transparent inorganic thin-film layer has an Ra (average roughness) value of not more than 5 nm and an Rmax (maximum roughness) value of not more than 80 nm; and wherein the pattern layer has a laminated structure comprising one or more types of color-patterned color filter layers, formed by disposing a colored resin film on the transparent support substrate and patterning the resin film in a desired pattern, and a color conversion layer containing a fluorescent material is provided on the color filter layers.

2. The color conversion filter substrate according to claim 1, wherein a second overcoat layer is held between the first overcoat layer and the first transparent inorganic thin-film layer.

3. The color conversion filter substrate according to claim 2, wherein a third overcoat layer and a second transparent inorganic thin-film layer are further provided in that order on the surface of the first transparent inorganic thin-film layer.

4. The color conversion filter substrate according to claim 3, wherein at least one of the first transparent inorganic thin-film layer and/the second transparent inorganic thin-film layer is formed of a material selected from the group consisting of silicon oxide, silicon nitride, silicon carbide, aluminum oxide, magnesium oxide, indium oxide, and composites thereof; and wherein at least one of the first transparent inorganic thin-film layer and/the second transparent inorganic thin-film layer is a gas barrier layer.

5. The color conversion filter substrate according to claim 1, further comprising:

a second overcoat layer, and a second transparent inorganic thin-film layer stacked in that order on the transparent support substrate, wherein at least the second overcoat layer is partially or wholly formed of a reaction product prepared by a chemical reaction mainly based on hydrolysis of a starting material comprising at least a material selected from the group consisting of aminoalkyldialkoxysilanes, aminoalkyltrialkoxysilanes, and composites thereof.

6. The color conversion filter substrate according to claim 1, wherein the transparent support substrate is formed of a transparent resin having a coefficient of linear expansion of not more than 80 ppm/K.

7. A color conversion-type color display comprising the color conversion filter substrate according to claim 1, and further comprising at least a transparent electrode layer provided in one or a plurality of electrically independent regions, a luminescent material-containing luminescent layer, and a second electrode layer stacked in that order on the color conversion filter substrate.

8. A process for producing a filter substrate comprising a transparent support substrates, and a pattern layer in a desired pixel pattern form, a first overcoat layer, a second overcoat layer, and a first transparent inorganic thin-film layer stacked in that order on the transparent support substrate, the process comprising the steps of:

providing a starting material comprising at least one material selected from the group consisting of aminoalkyldialkoxysilanes, aminoalkyltrialkoxysilanes, and composites thereof; and reacting the starting material mainly based on hydrolysis of the starting material to obtain a reaction product to form the second overcoat layer.

9. A color display comprising:

a color filter substrate comprising:

a transparent support substrate; and a pattern layer in a desired pixel pattern form, a first overcoat layer, a first transparent inorganic thin-film layer, at least a transparent electrode layer provided in one or a plurality of electrically independent regions, a luminescent material-containing luminescent layer, and a second electrode layer stacked in that order on the color filter substrate;

wherein the pattern layer comprises one or more types of color-patterned color filter layers formed by disposing a colored resin film on the transparent support substrate and patterning the resin film in a desired pattern;

wherein the first overcoat layer is at least partially formed of a reaction product prepared by a chemical reaction mainly based on hydrolysis of a starting material comprising at least one material selected from the group consisting of aiminoalkyldialkoxysilanes, aminoalkyltrialkoxysilanes, and composites thereof; and wherein a surface of the first transparent inorganic thin-film layer has an Ra (average roughness) value of not more than 5 nm and an Rmax (maximum roughness) value of not more than 80 nm.

10. The color display according to claim 9, further comprising a second overcoat layer held between the first overcoat layer and the first transparent inorganic thin-film layer.

11. The color display according to claim 10, further comprising a third overcoat layer and a second transparent inorganic thin-film layer provided in that order on the surface of the first transparent inorganic thin-film layer.

12. The color display according to claim 11, wherein at least one of the first transparent inorganic thin-film layer and the second transparent inorganic thin-film layer is formed of a material selected from the group consisting of silicon oxide, silicon nitride, silicon carbide, aluminum oxide, magnesium oxide, indium oxide, and composites thereof; and wherein at least one of the first transparent inorganic thin-film layer and the second transparent inorganic thin-film layer is a gas barrier layer.

13. The color display according to claim 9, further comprising a second overcoat layer and a second transparent inorganic thin-film layer stacked in that order on the transparent support substrate;

wherein the second overcoat layer is at least partially formed of a reaction product prepared by a chemical reaction mainly based on hydrolysis of a starting material comprising at least one material selected from the group consisting of aminoalkyldialkoxysilanes, aminoalkyltrialkoxysilanes, and composites thereof.

14. The color display according to claim 9, wherein the transparent support substrate is formed of a transparent resin having a coefficient of linear expansion of not more than 80 ppm/K.

* * * * *